March 14, 1933.  C. BIRDSEYE  1,901,625
FISH SCALING DEVICE
Filed April 3, 1928  6 Sheets-Sheet 1

INVENTOR
Clarence Birdseye
BY
Howard P. Knia
ATTORNEY

March 14, 1933.   C. BIRDSEYE   1,901,625
FISH SCALING DEVICE
Filed April 3, 1928    6 Sheets-Sheet 2

INVENTOR
Clarence Birdseye
BY
Howard P. King
ATTORNEY

March 14, 1933. C. BIRDSEYE 1,901,625
FISH SCALING DEVICE
Filed April 3, 1928 6 Sheets-Sheet 4

INVENTOR
Clarence Birdseye
BY Howard P. King
ATTORNEY

March 14, 1933. C. BIRDSEYE 1,901,625
FISH SCALING DEVICE
Filed April 3, 1928 6 Sheets-Sheet 5

INVENTOR
Clarence Birdseye
BY
Howard P. King
ATTORNEY

March 14, 1933.  C. BIRDSEYE  1,901,625
FISH SCALING DEVICE
Filed April 3, 1928  6 Sheets-Sheet 6

INVENTOR
Clarence Birdseye
BY
Howard P. King
ATTORNEY

Patented Mar. 14, 1933

1,901,625

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

FISH SCALING DEVICE

Application filed April 3, 1928. Serial No. 266,935.

This invention relates to machines for treating fish in preparing them for packing, storage or the market. More particularly the invention relates to machines designed to operate automatically and continuously upon fish presented to it in rapid succession. In machines of this type, great difficulty has been experienced in securely and uniformly presenting the fish to the treating means, both on account of the slippery nature of the fish and from the fact that they vary in size and dimensions. In one aspect my invention comprises a machine for treating fish, in which provision is made for positioning each fish presented to the machine and then engaging the fish, while thus positioned, by conveying means at a predetermined place in the head of the fish so that it may be positively controlled and presented accurately to the operating instrumentalities of the machine. I further contemplate maintaining the fish in elongated position during its treatment by confining it in a channel having open-work walls. Such construction has been found particularly effective in positioning the fish to the best advantage and insuring uniform treatment upon fish of varying size presented promiscuously to the machine.

While my invention may be embodied in machines for performing any desired operation upon the fish, it may be applied with particular advantage to machines for removing the scales. In another aspect, therefore, my invention comprises an automatic machine comprising a pair of rotary brushes or similar instrumentalities or tools arranged to operate through the open-work walls of a channel in which the fish is conveyed and maintained in an elongated position during the scaling operation.

The features and advantages of the invention will appear more clearly from the following description of a preferred embodiment thereof, selected for purposes of illustration and shown in the accompanying drawings, in which

Figure 3 is a side elevation looking in the direction of arrow numbered "3" in Fig. 1;

In the specific embodiment of the invention illustrated particularly in Figures 1 to 9 inclusive, the reference numeral 1 indicates a suitable frame work on which the various parts are mounted and which preferably provides an upwardly inclined top or table portion 2 on which the fish to be operated upon may be received at the lower end and discharged at the high end of the machine. As shown clearly in Figures 1, 4 and 5, I provide a conveyor 3, shown as a chain operating around sprocket wheels 4, 5, substantially in the plane of the top portion of the frame. In fact, I prefer to channel out one of the side members of the top portion of the frame, as at 6 to provide a guideway for the said chain, the said side member having appropriate slots 7, 7 at its opposite ends for entry of the rim of the sprocket wheels and the chain. One of the sprockets, as at 5, is driven by a worm wheel 8 on its shaft 9 in mesh with a worm 10 on a transverse or main driving shaft 11, said transverse shaft 11 having a sprocket wheel 12 thereon driven by a sprocket chain 13 from a motor 14. Obviously, however, other driving means may be employed if so desired. The conveyor chain 3 is provided at intervals with spikes 15 in the plane of the sprockets so arranged as to project crosswise of the frame as the chain passes through the guideway 6 with the point of the spike adjacent to the opposite side member so that fish carried on the spike will be prevented from sliding off of the spike until the spike begins to swing around the sprocket wheel 5. The guideway or recess 6 (see Fig. 5) formed in one of the side walls of the frame, serves to engage the base portion of each spike as it travels through the channel formed by all the walls of the frame and to prevent the spike from swinging laterally while traveling with the fish engaged thereby. It will be understood that the term "base portion" of the spike may also include a special link by which the spike may be secured to the conveyor chain, as for all practical purposes, such link forms the base portion of the spike. The arrangement is such that as the spike swings around the first sprocket 4, it pierces fish 16 and carries the fish along until the spike arrives at the other end of the machine where the fish is dropped off again.

In order to feed the fish to the machine I preferably provide a chute 17. The chute preferably is arranged to enable the fish to come to the bottom thereof by gravity, although the presentation of the fish may be obtained in any other suitable manner. At the lower end of the chute where it adjoins the machine, there is an adjustable stop or trap 18 against which the nose of the fish will engage for stopping the fish in the right position for the spike to enter the fish's head as the spike swings around the sprocket wheel. The stop 18 is yieldingly maintained in its initial position and is displaced to permit the passage of the fish as the latter is positively advanced against it after being impaled upon the spike. I preferably make the position of this trap adjustable so as to accommodate runs of different kinds or sizes of fish. I also provide means, such as a spring 19 positioned edgewise in the lower part of the chute 17 for adjustably directing the fish toward the side wall of the chute next to the sprocket so as to be in position to receive the spike as it comes around the sprocket. This holding or directing means 19 is of such a nature that it will be readily pushed aside by the larger fish and will not interfere with the passage of the fish into the machine as the spike catches the fish's head to pull the fish along. Likewise, I preferably provide a top holding means 20 which in the present disclosure consists of a strip of material hinged as at 21 at its end away from the trap 18 and pressed downwardly at its end next to the trap by means of a spring 22 (see Figures 1, 3 and 8). This construction also is of such a nature that fish of different sizes may be accommodated and will not be prevented from attaining their right position ready to be engaged by the spike.

Figure 6:
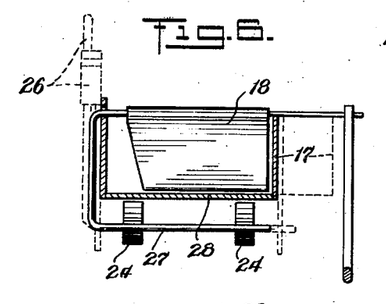
Figure 6 is a sectional view on line 6—6 of Fig. 3.
Figure 7:
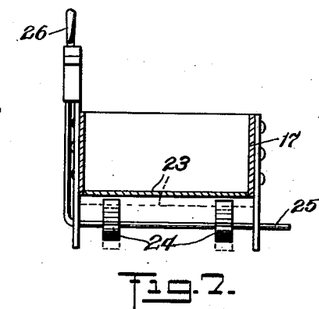
Figure 7 is a sectional view on line 7—7 of Fig. 3.
Figure 8:
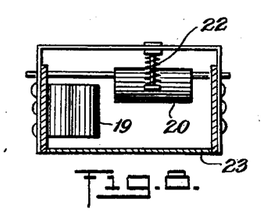
Figure 8 is a sectional view on line 8—8 of Fig. 3.

It is desirable in the construction of the chute to enable the elevation of the fish to be altered according to the size or character of the fish being put through the machine, so that the spike will penetrate the right part of the head, that is, neither too high nor too low. With this end in view I provide an adjustable bottom 23 to the said chute as shown more particularly in Figures 2 and 8. If so desired, the controlling means for adjusting the bottom wall of the chute and for adjusting the trap 18 may be combined as a single control. I have accordingly illustrated this construction in the drawings, but without restricting the invention thereto except as hereinafter claimed. In the construction illustrated, I provide a pair of cams 24 underlying the said adjustable bottom 23, said cams being carried upon a shaft 25 so as to be rotated simultaneously. In one position of these cams, the bottom wall is held up to the lower edge of the side wall shown in Figure 7 and as the cams are turned the bottom wall is lowered. At the end of the shaft 25 I provide a lever 26 for rotating the shaft, the lever being shown in Figure 3 as having three positions for large, medium and small fish respectively and being shown in the position for operating upon small fish so that the adjustable bottom of the chute is in its raised position. The body of the stop 18 depends from a transverse shaft journaled at one end in an ear projecting from one wall of the chute and at the other end in an inclined bracket secured to one leg of the machine. The shaft is bent downwardly at its left end, as seen in Fig. 6, and its lower portion 27 passes beneath the chute in position to engage the cams 24. A spring, not shown, holds the lower portion 27 of the shaft against the periphery of the cams 24, which thus adjustably determines the initial position of the stop. When the cams 24 are turned to lower the bottom 23 for the accommodation of large fish, they also advance the position of the stop 18 by swinging the shaft in a clockwise direction, as seen in Fig. 3, and thus allow for the increased length in the heads of the larger fish. However, other means of control may be substituted in place of the specific means herein shown and described. Furthermore, as particularly illustrated in Figure 3, the bottom wall 28 of the channel from the lower end of the chute to the machine is also hinged at its end next the machine, as at 29 so as to swing down with the downward swinging of the bottom of the chute and afford an uninterrupted slideway for the fish, the outer end of said bottom 28 being carried by the cams 24. The two hinged bottoms 23 and 28 preferably overlap so they will function in use in any position to which they are adjusted.

As the fish is carried by the spike through the machine, it preferably passes longitudinally on its side along bars or openwork 30 forming the bottom of the channel and prevented from upward displacement by means of similar longitudinal bars or open-work 31 forming the top of the channel. These upper bars are preferably floating, that is, are normally in a position to accommodate a so-called small fish, but can be forced upwardly against coil springs 32 so as to accommodate medium and large fish. The floating support for these bars or open work provides cross-bars 33 at intervals for supporting the longitudinal bars and pins 34 projecting upwardly from said cross-bars and slidingly passed through fixed yokes 35 with said springs 32 mounted on the pins between the cross-bars and the yoke. The floating support of the upper open-work is such, as indicated, to admit passage of various sized fishes, but will not permit a fish to double up or buckle while passing between the subsequently described scaling devices.

Figures 4, 5:
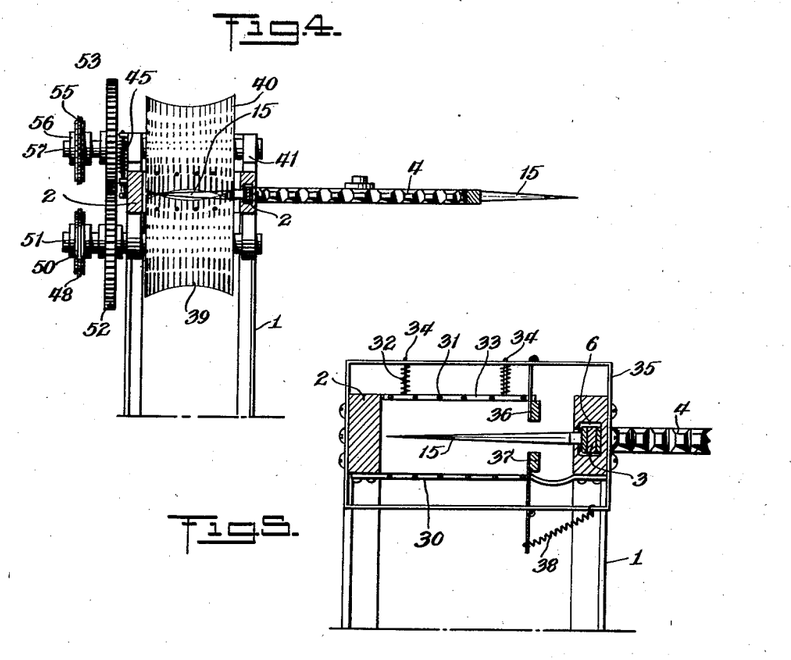
Figure 4 is a sectional view on line 4—4 of Fig. 1.
Figure 5 is a sectional view on line 5—5 of Fig. 1.
Figure 5:
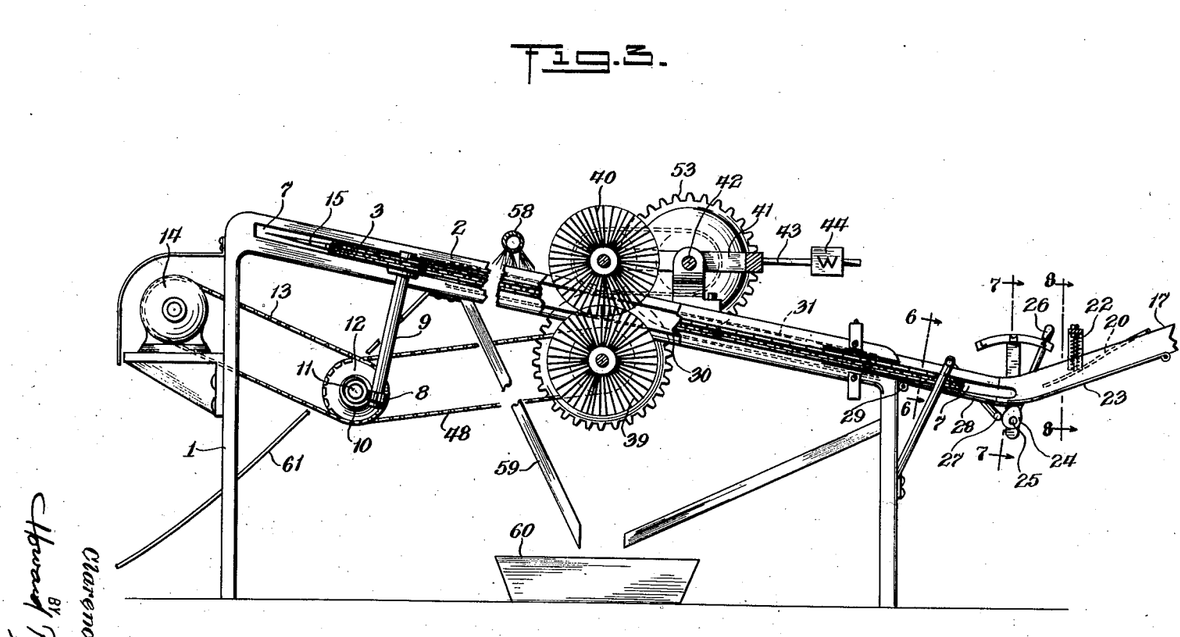

Preferably the side of the channel opposite the point of the spikes is fixed, and in the present showing I have illustrated the side of the channel as a side member of the frame. At the side of the channel next the bases of the spikes, I preferably provide a movable side wall to accommodate the large fish. As shown in Fig. 5, the movable side wall may comprise hinged members 36 and 37 extending lengthwise of the channel and adapted to swing toward and away from the side wall or frame member. As illustrated, the said members 36 and 37 are hinged longitudinally of said members, gravity being utilized to hold the upper one in normal position and a spring 38 being utilized to retain the lower member in its normal position. However, I do not confine myself to this particular construction, the essence of this feature of the invention being the provision of an adjustable side wall.

As the fish is carried along within the confines of the channel thus formed, the scales are removed by scaling devices, which in the present instance I have shown as brushes 39 and 40. Preferably one brush operates at the bottom of the channel and the other brush operates at the top of the channel so as to scale the entire fish. The bristles of the brushes are preferably sufficiently flexible so as to pass between the longitudinal rods 30 and 31 to engage the surface of the fish therebeneath said rods passing right through the brushes. I find in practice that these rods do not interfere with perfect scaling, and the construction has proved successful in practice in removing all the scales. Preferably the lower brush is on a fixed axis, that is, does not move up or down, being free to rotate only. The upper brush as shown is arranged to move up and down as well as rotate. This movement accommodates whatever size fish may be passed through the channel. As one means for obtaining the up and down movement of the brush, I have shown the same carried at one end of the yoke 41, shown hinged or pivoted on an axle 42, said yoke having an extension 43 carrying an adjustable weight 44 to steady the operation of the brush. The upper brush is actuated toward the lower one by a suitable spring 45 (see Figure 2), which may be adjusted in tension.

Figure 9:
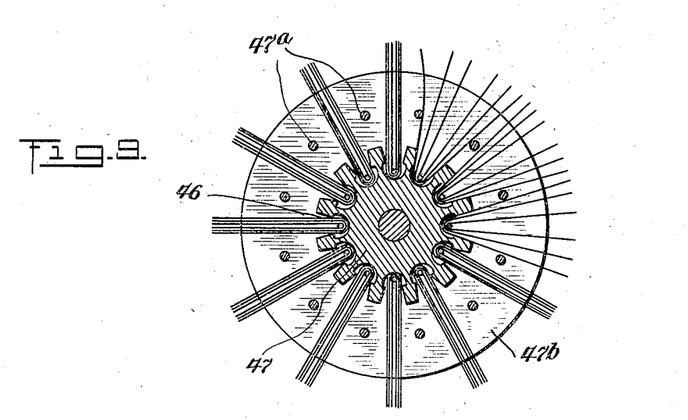
Figure 9 is a cross-sectional view through one of the scaling brushes.

Preferably the brushes are constructed with bristles of resilient metal, and in order to overcome any tendency of metal to crystallize when repeatedly bent over a definite edge, I have shown the brush constructed in Figure 9 with counter-sunk holes 46 in the hub or body 47 of the brush so as to enable the bristles to have a considerable latitude of swing, before the bristles engage the edge of the hub, as indicated at the upper right hand side of Figure 9. I also preferably provide a plurality of parallel rods 47a around the hub at a distance therefrom but within the bristles so positioned that a considerable flexing of the bristles at the hub is counteracted by engagement of the bristles with the rods. After such engagement, further flexing of the bristles will be at the point of such engagement with the rods 47a. These rods may be carried by plates 47b at the ends of the brushes.

Actuation of the brushes may be obtained from the same motor which actuates the conveyor, if so desired, and by way of illustration I have shown the lower brush driven by sprocket chain 48 from a suitable sprocket 49 on the main driving shaft 11 and corresponding sprocket 50 on the axle 51. On this same axle I have shown a gear 52 which meshes with gear 53 carried on the axle 42 on which the yoke 41 is mounted. On this same axle and fast with respect to said gear 53 is a sprocket 54 over which rides a chain 55 which passes around another sprocket 56 on the axle 57 of the upper brush 40.

It is to be noted that I preferably actuate the brushes so that the portions of the periphery which are next to each other, that is, which engage the fish being treated, are rotating in the same direction and are rotating in the direction in which the fish is being transported. Since the fish is being moved head first, the rotation of the brushes in the same direction will cause the bristles to engage against the ends of the scales, in other words, brushes against the grain of the scales and thereby most efficiently removes the same. The fact that the spikes on the conveyor are regulating the speed of the fish and the upper and lower rods 30 and 31 are holding the fish against doubling up or turning over, the brushes may rotate at a considerably greater speed than the rate of movement of the fish, and consequently a very thorough scaling of the fish may be effected.

Furthermore, it is preferable that the brushes be concave longitudinally and so arranged that they normally overlap each other for a considerable portion of their length thereby insuring engagement of the ends of the bristles with small fish and yet not necessitating an excessive flexing of the metal bristles of the brushes when engaging large fish. Suitable sprays 58 may be arranged at such places as found desirable in connection with the machine for washing the fish and the scales, and preferably a chute 59 is arranged beyond the brushes for enabling the scales removed and washed from the fish to be carried to a settling pan 60 or otherwise disposed of.

Figure 1:
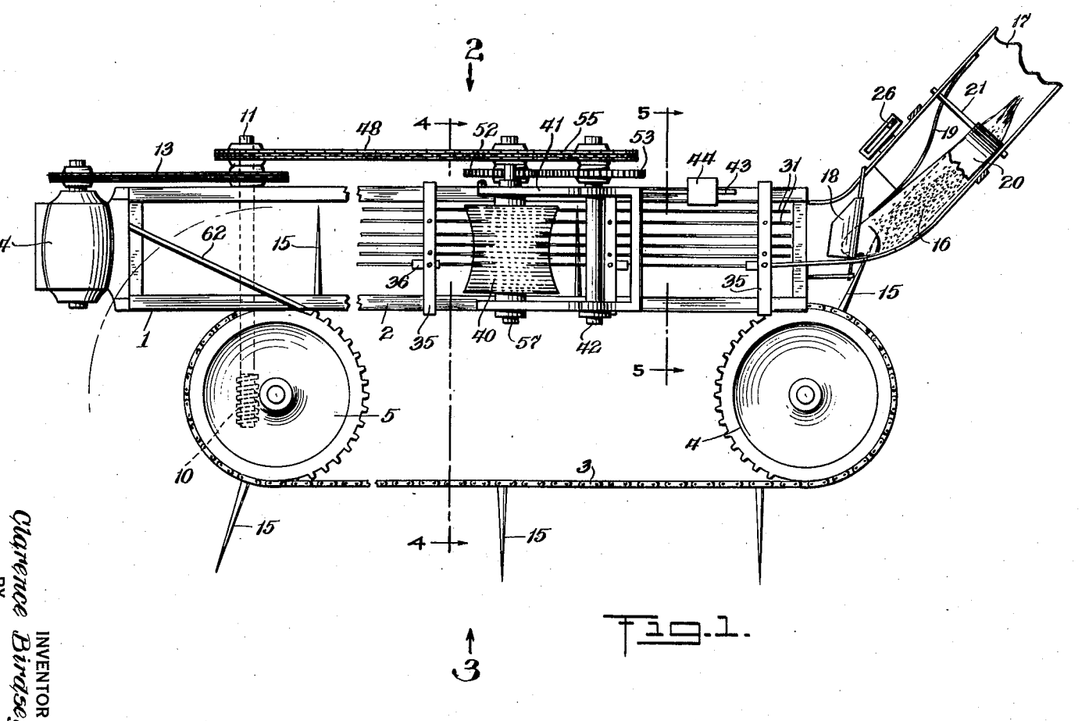
Figure 1 is a plan of a machine embodying my invention.
Figure 2:
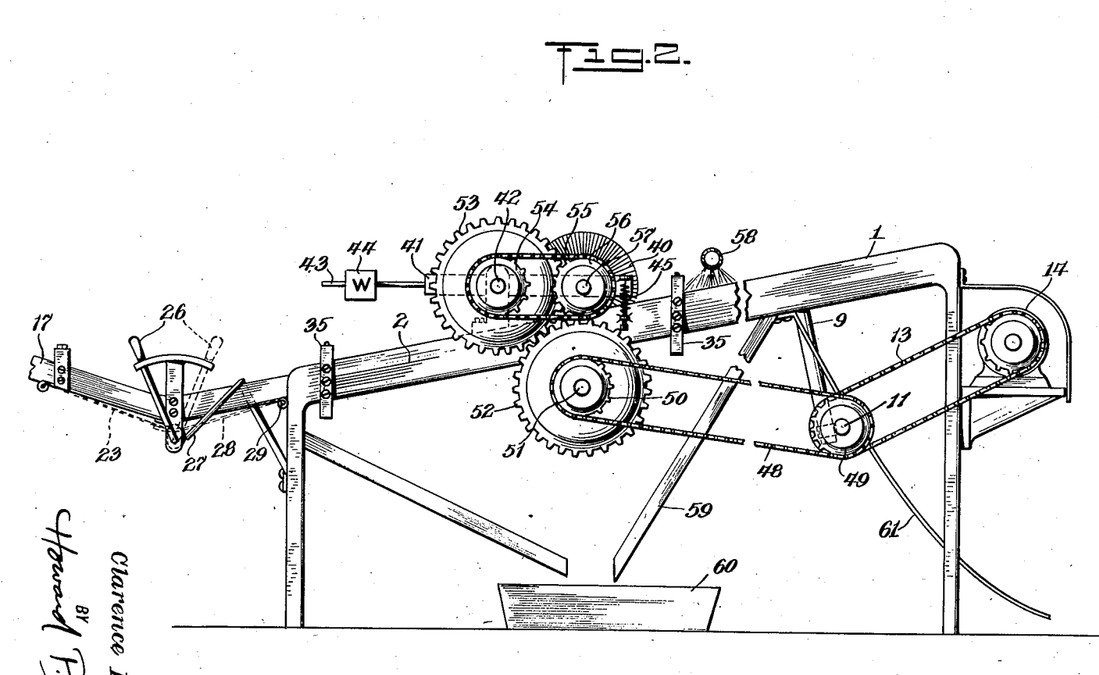
Figure 2 is a side elevation looking in the direction of arrow numbered "2" in Fig. 1.

After the fish has passed through the channel formed by the bars 30 and 31 and comes to the ends of those bars, it can swing on the spike so as to assume a vertical position, and while in that position can be pushed off of the spike and carried as by gravity down a chute 61 for further treatment, storage or use. The particular means shown herein for removing the fish provides a sloping bar 62 in proximity to the path of movement of the spike whereby the head of the fish will engage the sloping bar as the spike advances and be pushed off of the spike as indicated in Figure 1.

Figure 10:
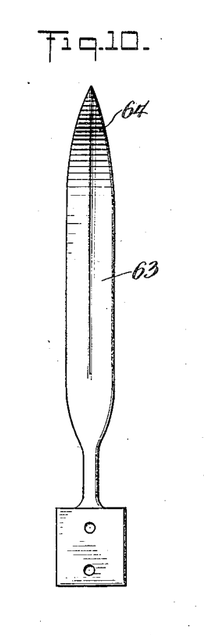
Figures 10, 11, 12 and 13 are elevations of modified constructions of spikes.
Figure 11:
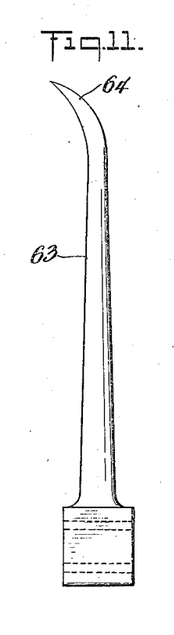

While in the foregoing description I have referred to a single type of spike of a substantially cylindrical shape, it is to be understood that the shape or the number or the positioning of the spikes may be altered as found most desirable in construction or use. Particularly if fish are to be scaled which tear very easily, it may be more desirable to employ a spike such as shown in Figures 10 and 11 which provides an upright flat portion 63 thereby providing greater surface for applying the actuated force to the fish. Likewise, the end of the spike may be curved as at 64. This curvature at the end of the spike enables the spike to enter the fish with less tear and also retains the fish on the spike until positively withdrawn by engagement of the fish by bar 62.

The position of the bar 62 may be varied so that it cooperates properly with the particular type of spike employed and to insure disengagement of the fish whether or not the fish is permitted to swing upon the spike.

Figure 12:
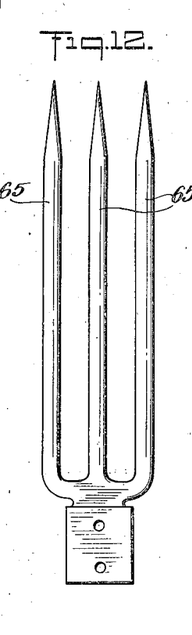
Figure 13:
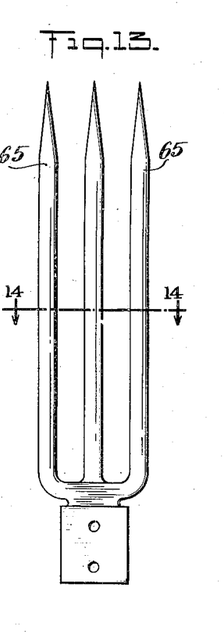
Figure 14:
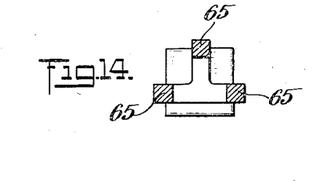
Figure 14 is a cross-sectional view on line 14—14 of Fig. 13.

In Figures 12 and 13 I have shown spikes having a plurality of tines 65, in this instance shown as three in number. In Figure 13 the middle tine is off-set from the plane of the other tines as clearly shown in Figure 14. Obviously other arrangements and constructions of spikes may be utilized without departing from the spirit or scope of my invention.

Figure 15:
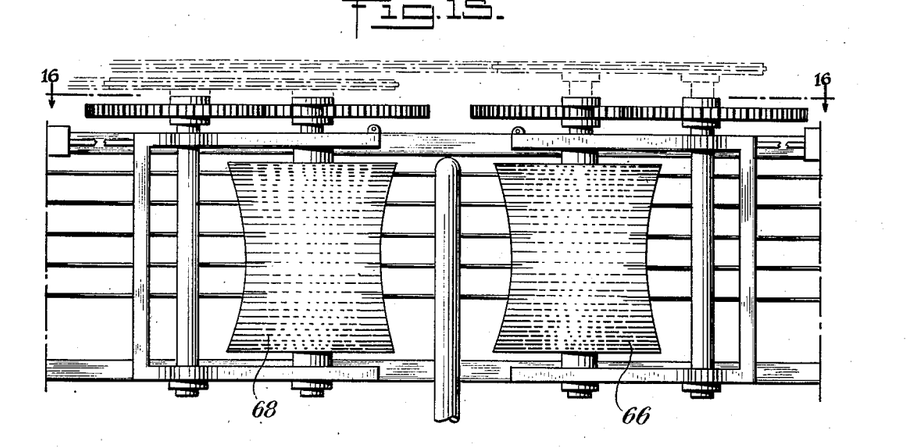
Figure 15 is a plan of a portion of a machine embodying my invention and showing a modified construction.
Figure 16:
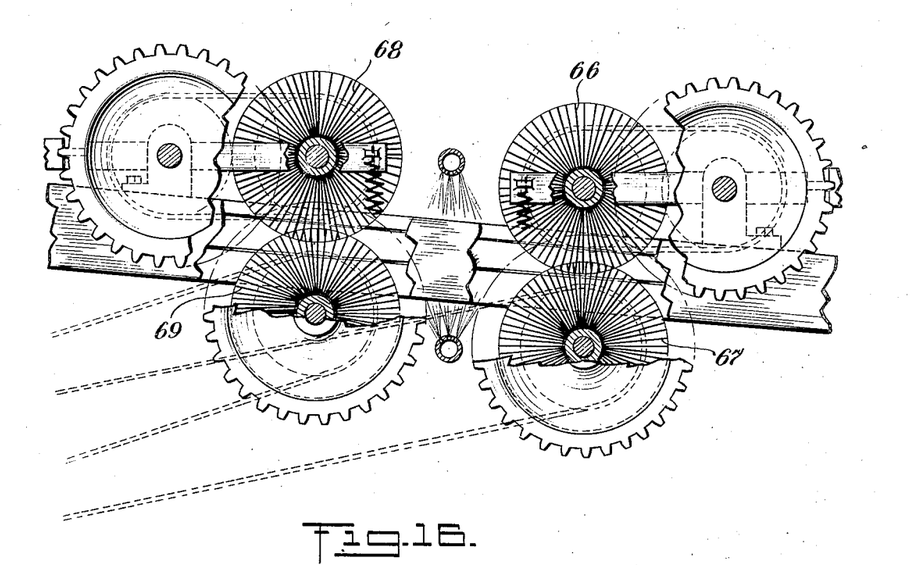
Figure 16 is a sectional view on line 16—16 of Fig. 15, with parts broken away.

In the foregoing description I have made particular reference to a construction embodying one pair of scaling brushes, but it is to be understood that these brushes may be employed in as many pairs as desired. In order to illustrate this feature of the invention I have shown in Figures 15 and 16 one pair of brushes 66 and 67 operating above and below a channel for the fish as hereinbefore described, and just beyond that pair of brushes I show another pair of brushes 68 and 69 mounted and operated in a manner similar to the first pair of brushes. With these brushes operating at an appropriate speed whereby the first pair of brushes will remove the scales, I find that the second pair of brushes performs the very valuable function of removing the epidermis which otherwise remains on the fish and gives it an objectionable appearance. While, however, I cite this as one advantage of the second pair of brushes, it is to be understood that they have other advantages, such as removing scales that escaped the first brush either intentionally or accidentally. Also I have found that the second pair of brushes enables me to operate the brushes at a slow rate of speed, thereby lengthening the effective life of the brushes and obtaining efficient results, and at less pressure, thereby retaining higher character of product.

Obviously other changes and modifications may be made in the construction and use of my improved machine, and I do not wish to be understood as limiting myself to the exact structure shown or described except as set forth in the following claims.

Having thus described my invention, I claim:

1. A machine of the character described comprising a chute for receiving fish, means for stopping a fish at a predetermined position in said chute, means for automatically engaging said fish while at said predetermined position and thereupon carrying the fish forward, and means for scaling the fish while being carried forward.

2. A machine of the character described, comprising feeding means for automatically engaging at a predetermined head portion a fish to be scaled and carrying the fish forward, means for obtaining a relative adjustment between said engaging means and the fish for accommodating fish of various sizes, and means for operating against the grain of the fish for scaling the fish.

3. In a machine of the character described having an open-work wall, a conveyor having outstanding spikes adapted to be moved laterally in a plane substantially parallel to said wall, means operating through said open-work wall for scaling fish carried by said spikes, and means cooperating with the conveyor for causing the spikes to engage the head portion of the fish whereby to hold it in proper scaling position during its travel.

4. In a machine of the character described having substantially parallel open-work walls forming a channel for passage of fish therebetween, a conveyor having a spike thereon, said conveyor arranged to carry the spike laterally in a plane between the said open-work walls, thereby enabling said spike to carry the fish through the said channel, and brushes operating through the open-work of said walls for scaling the fish.

5. In a machine of the character described having substantially parallel open-work walls forming a channel for passage of fish therebetween, a conveyor having a spike thereon, said conveyor arranged to carry the spike laterally in a plane between the said open-work walls thereby enabling said spike to carry the fish through the said channel, means operating through the open-work of said walls for scaling the fish, and means for automatically engaging the fish on said spike at the entry end of said channel.

6. In a machine of the character described having substantially parallel open-work walls forming a channel for passage of fish therebetween, a conveyor having a spike thereon, said conveyor arranged to carry the spike laterally in a plane between the said open-work walls, thereby enabling said spike to carry the fish through the said channel, means operating through the open-work of said walls for scaling the fish, and means for automatically discharging the fish from the spike after passing the scaling means.

7. In a machine of the character described having substantially parallel open-work walls forming a channel for passage of fish therebetween, a conveyor having a spike thereon, said conveyor arranged to carry the spike laterally in a plane between the said open-work walls thereby enabling said spike to carry the fish through the said channel, brushes operating through the open-work of said walls for scaling the fish, and means providing a floating support for one of said open-work walls for accommodating fish of different sizes.

8. A machine of the character described, comprising a fixed longitudinal side wall, a fixed longitudinal bottom wall, an adjustable side wall and an adjustable top wall, said walls forming a channel through which fish may be passed, the adjustable top and side wall accommodating fish of various sizes, means for actuating fish through said channel, and means for scaling the fish while passed through said channel.

9. In a fish scaling machine, a channel having a continuous fixed wall, means for conveying the fish through said channel, and means providing a floating support for a wall opposite the first-named wall of said channel for accommodating fish of different sizes.

10. A machine for treating fish, comprising a channel having opposed walls of longitudinally disposed rods with unobstructed spaces between them, means for feeding a fish along said channel while the fish is held straight by the rods, and oppositely disposed rotary brushes arranged to act upon the fish while it is held by the rods.

11. A machine for treating fish, comprising a channel having upper and lower walls of parallel longitudinally disposed rods with spaces between them, said walls being relatively movable in a yielding manner, means for advancing fish along said channel held straight by said rods, and a rotary brush arranged to act upon the fish through the spaces between the rods.

12. A machine for treating fish, comprising a channel having upper and lower walls of spaced parallel rods, one of said walls being bodily movable toward and from the other to accommodate fish of various sizes, feeding means acting through one of the side walls of the channel to advance fish along the same while held straight by said rods, and a rotary brush with bristles sufficiently flexible to pass between the rods and act upon the fish while held straight by them.

13. A machine for treating fish, comprising a channel having a fixed wall, an oppositely disposed yielding wall, a feeding spike operating from the yielding wall side to advance a fish along the channel, and scaling brushes arranged to act upon the fish while engaged between said walls.

14. A machine for treating fish, comprising a channel having a stationary wall, an opposed cooperating wall having outwardly yielding sections spaced apart, a feeding spike arranged to travel in the space between said sections to advance a fish along the channel in contact with said stationary wall, and scaling brushes arranged to act upon the fish during its passage along the channel.

15. A machine of the character described, comprising a channel having a side wall, an endless conveyor having one reach disposed opposite to the side wall and provided with spikes projecting therefrom into the channel and toward said wall adapted to transport fish engaged thereon along one reach of the conveyor, and means providing a passage for said reach of the conveyor causing it to travel in a substantially straight path and preventing it from buckling toward said wall.

16. A machine of the character described, comprising means for receiving and successively locating fish of various sizes with the head of each in predetermined position, automatically acting means for impaling each fish at a single predetermined point in its head and positively advancing the fish, a channel having opposite walls of spaced continuous rods engaging the fish throughout its advancing movement and maintaining it in elongated condition, and rotary scaling tools acting through said rods upon the fish while so held and advanced.

<div style="text-align:center">CLARENCE BIRDSEYE.</div>